3,458,989
RAYON TIRE CORD FINISH
Samuel James O'Brien, Dunellen, and William Julius van Loo, Jr., Middlesex, N.J., assignors to American Cyanamid Company, Stamford, Conn., a corporation of Maine
No Drawing. Filed Feb. 18, 1965, Ser. No. 433,792
Int. Cl. D02g *3/36, 3/40*
U.S. Cl. 57—153    11 Claims

ABSTRACT OF THE DISCLOSURE

Method for binding rayon tire cord to obtain good adhesion and rot resistance of the cord which comprises wet fixing a catalyst containing hardenable aminoplast resin onto viscose rayon tire cord and thereafter vulcanizing the thus treated tire cord to rubber.

---

This invention relates to (1) a rubber-vulcanized viscose rayon tire cord having a highly adhesive cord-to-rubber bonding and having increased durability, i.e., rot resistance, and (2) the method of preparing the vulcanized tire cord. More particularly, this invention relates to the treatment of viscose rayon tire cord with particular fiber reactive materials and particular catalysts which produce a surprisingly high degree of adhesiveness and rot resistance in rubber-vulcanized viscose rayon tire cord.

In the manufacture of tires, the tire cord most frequently used is either nylon or high tenacity viscose rayon. Each of these synthetics have definite advantages over the other. Similarly, each has its respective deficiencies. For example, nylon tire cords tend to "creep" or stretch when the tire stands with a load on it for any substantial period of time, whereby "flat spots" develop. On the other hand, viscose rayon does not creep. However, viscose rayon tire cords becomes highly susceptible to rot whereby the tensile strength is substantially reduced, if the tire is bruised or cut to a degree that moisture can reach the cord, for example.

The tires produced for commercial use for today's market must be of a character which will satisfactorily endure many miles of use and abuse, which includes traveling over rough terrain, being subjected to varying weathering conditions, and being subjected to high temperatures resulting from high speeds of travel. In order to satisfactorily endure these typical conditions, it is necessary that, for example, the adhesive employed to bind the tire cord to the rubber be capable of enduring the conditions without the breaking of the cord-to-rubber bond. It would also be desirable for the tire cord to be resistant to rot.

Although there are many adhesives which might be applied to tire cord to obtain satisfactory binding power or which might satisfactorily endure less severe wearing conditions, there are relatively few adhesives which are capable of retaining the adhesive bond when subjected to the typical severe conditions referred to above.

Similarly, overcoming the problem of rot of viscose rayon tire cord is a formidable task because the conventional anti-rot agents are typically unsuited for inclusion into rubber-vulcanized viscose rayon tire cord for use under the conditions discussed above. Additionally, there is the possibility in many cases that the agent will decrease the durability of the rubber-vulcanized viscose rayon tire cord in one manner or another. For example, it is critical that the tire cord not lose any of its tensile strength as a result of the inclusion of miscellaneous agents.

The question is frequently raised as to the differences between the mildewing and rotting of a material. This is best explained in that mildew consists predominantly of surface-growth microorganisms such as *Aspergillus niger, Aspergillus terreus, Penicillium glaucum,* and the like, while rotting is generally the consequence of the consumption of cellulosic material by cellulolytic microorganisms such as *Chaetomium globososum, Myrothecium verricaria, Memnoniella echinata,* and the like. However, whenever mildew is present, the rotting organisms are normally also present.

Typical agents which are not fully satisfactory for the treatment of tire cord, include compounds such as copper naphthenate, copper oleate, copper 8-hydroxyolate and the like. There are many others which are unsatisfactory, for reasons already discussed.

Thus, there exists a genuine challenge to develop a process by which rot resistance may be imparted to viscose rayon tire cord without reducing the critical tensile strength of the tire cord.

There exists a genuine challenge to provide an adhesive and method by which such adhesive produces a durable viscose rayon tire cord in the vulcanized condition.

Therefore, an object of this invention is to provide a method for binding viscose rayon cord to the rubber to produce a durable rubber-vulcanized viscose rayon tire cord.

Another object is to provide a durable rubber-vulcanized viscose rayon tire cord having rot-resistance.

Another object is to provide a method utilizing an agent which both (1) binds viscose-rayon tire cord to rubber, and (2) imparts a rot-resistance.

These and other objects and advantages of the present invention will become apparent from the detailed description thereof set forth in the above and following disclosure.

In accordance with this invention a rubber-vulcanized viscose-rayon tire cord, having a high degree of cord-to-rubber bonding and rot-resistance, having good durability, is obtained by wet-fixing a catalyst containing hardenable aminoplast resin onto viscose rayon tire cord, placing rubber in contact with the tire cord and vulcanizing the same to a sufficient degree to form a durable cord-to-rubber bonding.

The expression "hardenable aminoplasts" as used with respect to the present invention is to be understood as including hardenable, if desired etherified, melamine-formaldehyde resins, which are either water soluble or are of limited water solubility and which are obtained in the known manner by condensation of formaldehyde with melamine. Compounds such, for example, as urea, thiourea, cyanamide, dicyandiamide, biguanide, formoguanamine, acetoguanamine, mixtures of such compounds and also their alkyl and acyl compounds are not operative for purposes of this invention. Good results are obtained by the use of water soluble condensation products of melamine and formaldehyde, including for example, a condensation product of limited water solubility from one mol of melamine and about three mols formaldehyde.

The phrase "condensation products of limited water-solubility" is to be understood, in the sense of the present invention to include those colloidal intermediate stages which occur by continuing the condensation beyond the crystalline methylol stage. They are characterized by the property that they are precipitated from their concentrated aqueous solutions by the addition of water (cf. Kolloid-Zeitschrift, vol. LVII, October-December 1931, page 233, left-hand column). The preferred aminoplast resin is a water-soluble alkylated methylol melamine.

The preferred water-soluble alkylated methylol melamine is normally prepared by condensing melamine and formaldehyde and subsequently reacting the methylol compound with a suitable alcohol, all under conditions which produce water-soluble products. Suitable alcohols include methyl alcohol, ethyl alcohol, propyl alcohol, and the like, glycols such as ethylene glycol, glycol ethers, and other alcoholic compounds capable of condensing with methylol groups present on the methylolated melamine to form water-soluble reaction products. Methyl alcohol is the preferred alkylating material. Examples of suitable alkylated methylolol melamines include: bis(methoxymethyl) methylol melamine, tris(methoxymethyl)-dimethylol melamine, and hexakis (methoxymethyl)melamine.

Unalkylated species include compounds such as monomethylol melamine, dimethylol melamine, and the like.

The condensation products of limited solubility in water are used either in the form of solutions which have been rendered soluble with the aid of acids, or are used in the form of emulsions.

For purposes of applicants' invention, it is critical that one or more catalysts from a particular group of catalysts be present for the function of catalytic hardening.

Suitable catalysts are limited to acids such as hydrochloric acid and sulfuric or formic acid, salts of strong acids with weak bases such as ammonium salts of strong inorganic or organic acids such as ammonium chloride, ammonium phosphate, ammonium nitrate, ammonium oxalate or ammonium lactate, and catalysts such as esters of polyhydric alcohols or of polybasic acids, of which the solubility in water or other solvent employed is sufficient to enable them to dissolve at the required concentration in the aminoplast bath. Such esters include for example, diacetin, monochlorhydrin, dichlorohydrin, glycoldiacetate, glycolmethylether acetate, glycolethyl ether acetate and diethyl tartrate.

Specific examples of catalysts which are not suitable for purposes of this invention include zinc chloride, and diammonium hydrogen phosphate.

It has been unexpectedly discovered that in addition to the above catalysts, aluminum chloride is the preferred catalyst for purposes of applicants' invention. Additionally, if a water-soluble alkylated methylol melamine is utilized as the aminoplast resin, only the aluminum salts derived from strong inorganic acids, namely, nitric, hydrochloric, and sulfuric, are suitable for purposes of this invention.

The bath for the impregnation according to this invention advantageously contains from about 3% to about 50% solids of aminoplasts, either in solution or in emulsion. The impregnation is advantageously carried out in a manner that the aminoplasts are conventionally deposited upon the fibers in a quantity ranging between about 2% to about 50% solids based on the weight of the tire cord being treated, the preferred percentage being from about 5% to about 30% solids based on the weight of the tire cord being treated.

The impregnating solution, when ready for use and containing the critical catalyst, is advantageously prepared so as to have a weakly alkaline pH value, and for this purpose no special addition is normally required when an aminoplast of weakly alkaline reaction and a neutral catalyst are used. At such a pH value, the bath can be kept for many days. As, however, even at room temperature slow hydrolysis of the bath gradually diminishes the pH in the course of time, it is therefore of advantage to take care that the pH value does not fall below 7 or 8. It is critical that the pH not fall below 6.5, because below pH 6.5, down to about pH 4, the melamine resin begins forming a uniform dispersion of a stable polymer in a colloidal state; this colloid frustrates the process. However, if the solution is acid, it is possible to carry out the process so long as the pH range from 0 up to about pH 4.

The catalyst is employed in the bath in an amount ranging from about 0.25% solid to about 15% solids based on the resin solids in the bath, and preferably the catalyst ranges from about 1% solids to about 10% solids based on the weight of resin solids.

It is not necessary to use any particular method of treating the tire cord with the treating solution. For example, any conventional procedure such as padding, spraying, immersion, etc., may be employed, so long as the necessary amount of the aminoplast resin is applied to the tire cord being treated.

The treated tire cord is cured (1) in a sealed container or otherwise to avoid loss of moisture, and (2) in a wet state, at temperatures sufficiently high to obtain complex fixation of the resin-catalyst composition. The temperatures may range from room temperature of about 70° F. or 85° F., up to about 350° F. The time of cure varies considerable depending upon the curing temperature employed. For example, if the resin is cured at room temperature, 24 hours or more may be required, whereas if the resin is cured at about 350° F., the cure might be completed within 15 minutes. For purposes of this invention, it is obviously necessary that the cure be at a sufficient temperature and for a sufficient time to obtain a substantially complete fixation-bond by the cure.

In order that the present invention may be better understood, Examples 1 through 5, and the corresponding Tables I through V are for purposes of illustration, and are not intended to limit the scope of this invention except as limited in the appended claims.

In the following examples, all parts and percentages are by weight unless otherwise designated.

In the examples, the treating solution is applied to rayon fabrics for the purpose of showing the percentage of nitrogen fixation, which reflects the degree of rot resistance which may be expected from the treatment of viscose rayon. In previous work, it has been demonstrated that nitrogen fixation in excess of 2% normally renders rot resistance. Therefore, in illustration of rot resistance, it is concurrently understood that if through weathering or moisture or other wearing conditions the viscose rayon tire cord becomes exposed, there is a tendency of the tire cord to rot and thereby to decrease in tensile strength. The treatment of this invention by protecting the tire cord against rot serves to prevent the deterioration normally following the wearing condition. In theory, the treatment of the resin is applied in an amount and cured to a degree sufficient to link the resin with at least about 33% or more of the available viscose rayon hydroxyl groups, thereby "blocking" rot possibilities.

EXAMPLE 1

Application of 15% solids unmethylated dimethylol melamine plus 10% diacetin based on the resin solids was made on viscose rayon challis from an aqueous solution by conventional padding methods. After the treatment, the treated swatch was wound on a glass rod and placed into a sealed container and wet-cured for 2.5 hours at 210° F. After curing, the swatch was removed and air-dried.

Tensile strength tests were made in accordance with American Association of Textile Chemists and Colorists Standard Test Methods as described in the 1962 Year Book.

Nitrogen analysis was made on untreated and treated swatches. Results are seen in Table I.

TABLE I

| Properties | Untreated | Treated |
| --- | --- | --- |
| Percent nitrogen, initial | | 3.9 |
| Percent nitrogen, fixed [1] | | 3.7 |
| Tensile strength (W+F in lbs.) | 109 | 111 |

[1] After boiling in water for 30 minutes.

Results show the treated rayon to have good fixation of nitrogen with no measurable degree of loss in tensile strength, and an actual increase in tensile strength appears to have occurred—possibly as the result of cross-linking.

EXAMPLE 2

Conventional viscose rayon tire cords were immersed in an aqueous bath containing 13.6% solids unmethylated dimethylol melamine resin plus 10% solids diacetin based on the resin solids. The cords were then squeezed on a micro-set padder obtaining 62% wet pickup equivalent to 8.5% solids of the resinous material on the cord. After the treatment, the wet cords were wound on a glass rod and placed in a sealed container and stored for 2.5 hours at 210° F. to complete the fixation and insolubilization of the treatment. The damp cords were then removed and air dried.

Nitrogen analysis, tensile strength and elongation tests were made by conventional testing methods.

Results are shown in Table II.

TABLE II

| Treatment | Percent nitrogen on cord | | Tensile strength [2] (lb./cord) | Percent ultimate elongation [2] |
|---|---|---|---|---|
| | Initial | Fixed [1] | | |
| Resin plus catalyst | 4.03 | 3.55 | 21.2 | 4.5 |
| None | 0.195 | | 20.3 | 3.0 |

[1] After 30 minutes boil in water.
[2] Instrom tensile tester used.

Results show that good nitrogen fixation with no measurable degree of adverse effects on tensile strength and a beneficial elongation is obtained with the resin treatment, and an actual increase in tensile strength appears to have occurred—possibly as a result of cross-linking.

EXAMPLE 3

The treated viscose rayon tire cords of Example 2 along with untreated cords were bonded to rubber in the following manner.

Vulcanization method

Tire cord was laid in parallel rows across the surface of a sheet of rubber tire carcass test stock in a preheated 6" x 6" x 0.075" mold in such fashion that the parallel cords were spaced ⅛" to ¼" apart. The rubber tire stock was then vulcanized under pressure for 30 minutes at 144.5° C. After cooling, the strength of the rubber-to-cord bond was evaluated by measuring the average force required to pull a specific number of cords from the rubber substrate by Instron Model T17 strength tester.

Results are shown in Table III.

TABLE III

Adhesion (lbs. pull-2 cords)

Treated cords _____ 1.69
Untreated cords _____ 0.98

It is shown that when the treated cords were used "as is" and compared to untreated cords in a standard rubber adhesion test, the treated cord shows a marked improvement in adhesion over that of the untreated.

EXAMPLE 4

Viscose rayon gabardine swatches were treated with various aqueous concentrations of bis(methoxymethyl)-methylol melamine plus aluminum chloride as the catalyst. The applications were made by a conventional padding procedure. Following the application the treated swatches were wrapped on glass rods and sealed in Mylar film. The treated swatches were wet-cured either at 210° F. for 2½ hours or at room temperatures for 24 hours. At the end of the curing period the swatches were rinsed and dried. Nitrogen analyses were made initially and after a ½ hour boil in water. Strip tensile strength tests were performed on swatches after 1 and 2 months soil burial. Results are shown in Table IV.

TABLE IV

| Percent resin solids applied [1] based on fabric wt. | Nitrogen, percent | | Nitrogen [2] Fixation, percent | Strip tensile strength (percent retained) | |
|---|---|---|---|---|---|
| | Initial | Fixed [2] | | 1 month | 2 months |
| Wet cured 2.5 hrs. at 225° F.: | | | | | |
| 10.0 | 3.04 | 2.77 | 91 | 13 | 0 |
| 15.0 | 4.78 | 4.33 | 90 | 45 | 20 |
| 20.0 | 7.68 | 7.09 | 93 | 73 | 47 |
| Untreated | 0.0 | 0.0 | | 0 | 0 |
| Wet cured 24 hrs. at room temp.: | | | | | |
| 10.0 | | | | 30 | 0 |
| 15.0 | | | | 100 | 18 |
| 20.0 | | | | 93 | 34 |
| Untreated | | | | 0 | 0 |

[1] 1% solids anhydrous aluminum chloride based on resin solids.
[2] After 30 minute boil in water.

Good rot-resistance is obtained on the treated fabrics when the finish is reacted with the fabric under either low or high temperature moist-curing conditions.

EXAMPLE 5

Typical viscose rayon tire cords were treated in an aqueous solution containing 35% solids of bis(methoxymethyl)methylol melamine plus 1.27% anhydrous aluminum chloride based on the resin solids. The cords were immersed in the liquor for 20 minutes followed by squeezing through a micro-set padder to obtain a 40% wet pickup. The treated cords were wound on a glass rod and wet-cured for 24 hours at room temperature in a sealed container. The amount of finish applied to the cords was 15% solids. After removing the container the treated cords were rinsed in clear water and air dried.

Untreated viscose rayon cords and the cords treated by the process of this example were subsequently treated with a typical natural latex resorcinol formaldehyde resin or a synthetic rubber latex resorcinol formaldehyde resin followed by drying and then cured into a natural rubber truck tire carcass by the producers noted in Example 3.

Tests were made on both types of cords to determine the force required to pull a pair of cords out of the cured carcass stock by the use of Instron Tester.

The results are shown in Table V.

TABLE V

Rayon cords and treatments:     Average pull of 2 cards (in lbs.)

Untreated plus natural latex, resorcinol formaldehyde resin _____ 1.56
Treated plus natural latex, resorcinol formaldehyde resin _____ 2.16
Untreated plus synthetic latex, resorcinol formaldehyde resin _____ 1.23
Treated plus synthetic latex, resorcinol formaldehyde resin _____ 1.33

Results show that treatment of this invention improves the adhesion of the cords to rubber tire carcass and considerably when the cords are after treated with natural latex-resorcinol formaldehyde resin.

In addition to the central components of the treating composition set forth above, other additives which are not inconsistent with and which do not destroy the effect of the essential components of the present invention may be added therewith, as for example, softeners, anti-static agents, fillers, pigments, dyes and the like. They may, for example, be incorporated into the particular treating solution or emulsion, and applied simultaneously with the resin composition of the present invention. The above examples are not intended to limit the scope of this invention except to the extent that the claims are hereafter limited.

We claim:
1. A method for binding viscose rayon tire cord comprising:
   (1) wet-fixing a catalyst-containing hardenable aminoplast resin onto viscose rayon tire cord, said resin being applied in an amount sufficient to bind and sufficient to impart durability; and
   (2) vulcanizing said tire cord with rubber, sufficiently to form a cord-to-rubber bonding.
2. A durable vulcanized tire cord, produced by the method of claim 1.
3. A method for binding viscose rayon tire cord comprising:
   (1) wet-fixing catalyst-containing hardenable unalkylated aminoplast resin onto viscose rayon tire cord, said catalyst being selected from the group consisting of (1) polyhydric alcohols and polybasic acids of the group consisting of diacetin, monochlorohydrin, dichlorohydrin, glycol diacetate, glycol methyl ether acetate, glycol ethyl ether acetate, diethyl tartrate, (2) acids of the group consisting of hydrochloric, sulfuric and formic acids, (3) salts of strong inorganic, and organic acids reacted with weak bases, and (4) water-soluble aluminum salts derived from strong inorganic acids; said resin being applied in an amount sufficient to bind and sufficient to impart durability, and
   (2) vulcanizing said tire cord with rubber, sufficiently to form a cord-to-rubber bonding.
4. A durable vulcanized tire cord, produced by the method of claim 3.
5. A method for binding viscose rayon tire cord comprising:
   (1) sufficiently immersing viscose rayon tire cord in an aqueous solution of dimethylol melamine resin and of a catalyst in a catalytic amount, to obtain a wet-pickup of from about 5% to about 20% of resin solids, based on the weight of said tire cord;
   (2) wet-fixing said resin at a curing temperature ranging from about 60° F. up to about 350° F.; and
   (3) vulcanizing said tire cord with rubber, sufficiently to form a cord-to-rubber bonding.
6. A vulcanized tire cord produced by the method of claim 5.
7. A method for binding viscose rayon tire cord comprising:
   (1) wet-fixing a catalyst containing hardenable alkylated aminoplast resin onto viscose rayon tire cord, said catalyst being an aluminum salt of a strong acid, said resin being applied in an amount sufficient to bind and sufficient to import a rot-resistance; and
   (2) vulcanizing said tire cord with rubber, sufficiently to form a cord-to-rubber bonding.
8. A durable vulcanized tire cord, produced by the method of claim 7.
9. A method according to claim 7, in which said catalyst is selected from the group consisting of aluminum nitrate, aluminum chloride, and aluminum sulfate.
10. A method of binding viscose rayon tire cord comprising:
    (1) immersing viscose rayon tire cord in an aqueous solution of bis(methoxymethyl)methylol melamine resin and of aluminum chloride in a catalyst amount, said resin being applied in an amount sufficient to bind and sufficient to impart a rot resistance;
    (2) wet-fixing said resin at a curing temperature ranging from about 60° F. up to about 350° F.; and
    (3) vulcanizing said tire cord with rubber, sufficiently to form a cord-to-rubber bonding.
11. A vulcanized tire cord produced by the method of claim 10.

References Cited
UNITED STATES PATENTS

| | | | |
|---|---|---|---|
| 3,050,419 | 8/1962 | Ruperti | 117—138.5 |
| 3,212,955 | 10/1965 | Kaizerman. | |
| 3,317,345 | 5/1967 | Fluck et al. | 8—116.3 R |

ROBERT F. BURNETT, Primary Examiner

LINDA M. CARLIN, Assistant Examiner

U.S. Cl. X.R.

8—116; 57—164; 117—138; 156—110, 180; 161—144, 175